Patented July 17, 1923.

1,461,807

UNITED STATES PATENT OFFICE.

ALBERT SILVER, OF TONOPAH, NEVADA, ASSIGNOR TO THE MERRILL COMPANY, A CORPORATION OF CALIFORNIA.

PROCESS OF TREATING ORES.

No Drawing. Application filed October 18, 1921. Serial No. 508,588.

*To all whom it may concern:*

Be it known that I, ALBERT SILVER, a citizen of the United States, residing at Tonopah, in the county of Nye, in the State of Nevada, have invented certain new and useful Improvements in Processes of Treating Ores, of which the following is a specification.

The invention relates to a process of treating ores, and more particularly to a hydrometallurgical process of treating ores containing matter which prematurely removes dissolved metals from solution in such processes.

In the treatment of ores for the recovery of the metallic content therefrom by leaching, such as the cyanide process, it has been found that some ores contain deleterious substances which prematurely remove the dissolved metals from the solution. In some cases only a portion of the dissolved metals is so removed. In other cases, substantially the whole of the dissolved metals is prematurely removed so that these ores cannot be commercially treated by such leaching processes as cyanidation. At the present time it is not clearly understood whether the deleterious substances actually precipitate the dissolved metals or whether they adsorb or absorb them. It is known, however, and has long been recognized, that when certain ores are treated by the cyanide process the effluent solution which should contain the metals is found to be barren. It is well known that certain ores contain carbonaceous material, such as graphite, which prematurely removes the dissolved metals from solution. It is also known that certain ores containing antimony sulphides act similarly. Accordingly such ores in their natural state are not adapted for treatment by the cyanide process. In view of this fact, many efforts have been made to discover and overcome the cause for the premature removal of the dissolved metal from solution by the deleterious foreign substance, whether carbonaceous or otherwise. So far as is known, these efforts and experiments have proven more or less unsatisfactory, so that, at the present time, certain ores containing these deleterious substances cannot be treated as a commercial proposition by the cyanide process.

The object of the present invention is to produce a process of treating ores containing matter which prematurely removes in leaching processes the dissolved metals from solution whether by precipitation, adsorption or otherwise, so as to adapt or condition such ores for treatment by leaching processes such as cyanidation. I am well aware that it has been proposed to adapt or condition these ores for treatment by the cyanide process by subjecting the ore to flotation in order to remove the deleterious substance, after which the residue is then subjected to the cyanide process for the recovery of the remaining metals. According to the present invention, the ore is treated as a whole without removing the deleterious substances from the remainder of the ore before it is subjected to either the cyanide or other leaching process. Although it will be understood that the invention is adapted for application to many kinds of leaching processes used for the recovery of the metallic content of ores containing deleterious substances, for the sake of convenience of description the invention will be described as particularly applied to the cyanide process.

The process of the invention consists in treating the ore so as to insulate or neutralize the deleterious substances or matter so that their power to prematurely remove the dissolved metals from solutions will be destroyed. This is done by bringing the ore into intimate contact with a protective agent substantially unalterable by the solvent, such as an oleaginous substance, by which the particles of the delterious matter are insulated, coated or otherwise rendered inactive. In carrying out this preliminary step of the process of treating ores according to the present invention, the ore is first ground to a suitable mesh. During the grinding, which is preferably done in the presence of water, a predetermined amount of the oleaginous substance, or other protective agent, is added to the mixture of ore and water in the mill so as to be brought into intimate contact with the particles of such deleterious substances as the ore may contain. The kind and quantity of oleaginous substance or other protective agent used will depend upon the nature and quantity of the deleterious substance present. With certain carbonaceous ores it has been found that five pounds of coal tar per ton of ore produced excellent results. Fuel oil with an asphaltic base also gives satisfactory results with some ores. By this I mean that when a carbonaceous ore is subjected to the preliminary insulating or neutralizing step of the process and is then subsequently treated by the cyanide process, a substantially complete recovery of the metallic content is made from the ore, whereas when such ore is treated by the cyanide process alone without the preliminary insulating or neutralizing step of the process, the recoveries have been unsatisfactory.

To illustrate the beneficial results obtained by the use of the present process, it is only necessary to cite two actual instances in which the process has been applied to ores containing deleterious substances. The process has been applied to ores from the Porcupine District in Canada. It is well known that certain of these precious metal-bearing ores contain carbonaceous matter in sufficient quantities to render their treatment by the cyanide process unsatisfactory. When a sample of these ores was treated by the cyanide process alone it was found that the extraction of the gold and silver was 56.95 per cent. When, however, the same sample was preliminarily treated with the insulating or neutralizing step of the present process and then subjected to the identical cyanide treatment, it was found that the extraction of the metals was 95.39 per cent. Another ore treated by the present process is that from a well known mine in California. This ore contains both graphitic and other carbonaceous substances. When the ore was subjected to the cyanide process alone the extraction was substantially nil. By first treating the ore according to the present process and then subjecting it to the identical cyanide treatment, a recovery of 75 per cent of the gold and silver was obtained.

When the ore has been ground in water in the presence of the proper amount of the requisite kind of oleaginous substance, the pulp is then preferably dewatered by decantation or filtration. The pulp is then subjected to the usual and well known steps of the cyanide process, which vary according to the nature of the ore. For example, the pulp may be agitated with cyanide solution and then filtered and washed and the solution thereby obtained precipitated with zinc dust for the removal and recovery of the metals.

In some cases it may be preferable not to add the oleaginous substance to the ore and water during the grinding operation, but to mix the pulp and oleaginous substance subsequently in a separate apparatus and agitate to bring them into intimate contact.

In the treatment of certain ores by the present process, particularly relatively rich ores, it has been found advisable as an aid to increased recovery, to grind the ore in water in the presence of the oleaginous substance, and then before the ore or pulp is subjected to the cyanide treatment, to filter and then dry the pulp containing the insulated or neutralized deleterious substance. This results in an increased recovery because upon drying the particles, a more perfect diffusion of the oleaginous substance over the surfaces of the deleterious matter is obtained. Moreover, this drying of the pulp results in a saving of cyanide because the less moisture there is in the pulp going to cyanide treatment the less cyanide is required to treat the pulp to dissolve the metal content. The drying is preferably effected at a low temperature, not exceeding 300° F., to obviate decomposition of certain constituents of the ore and particularly of the oleaginous substance.

It is convenient to summarize the steps of the process as follows:—The precious metal-bearing ore containing deleterious substances such as some carbonaceous matter or other material which has the property of prematurely removing dissolved metals from solution, is first ground in water. The oleaginous substance, or other protective agent, may be mixed with the ore and water during the grinding, or it may be subsequently mixed with the pulp in a separate apparatus and agitated to secure an intimate contact between the particles of the deleterious substance and the insulating or neutralizing oleaginous substance. With the ordinary ore, where it is not a commercial proposition to dry the pulp before it is subjected to the cyanide process, after the particles of the deleterious substance have been thoroughly insulated or neutralized, the pulp is subjected to the particular form of cyanide process best adapted for the recovery of the metals contained in the ore. Where the ore is high grade, when the particles of the deleterious substance have been thoroughly insulated and neutralized so that their power of prematurely removing the dissolved metals from solution is destroyed, the pulp is then dewatered and dried at low temperature. The dried cake is then cyanided in the usual manner.

Having thus described the invention what I claim is:—

1. The process of treating ores containing matter which prematurely removes dissolved metals from solution, which consists in insulating said matter by bringing the ore in contact with a substance which destroys the power of the matter to prematurely remove the dissolved metals from solution, then, without separating said matter from the ore, subjecting the ore to a metal solvent and then separating the solution from the gangue.

2. The process of treating ores containing matter which prematurely removes dissolved metals from solution, which consists in insulating said matter by bringing the ore in contact with an oleaginous substance, then, without separating said matter from the ore, subjecting the ore to a metal solvent and finally separating the solution from the gangue.

3. The process of treating ores containing matter which prematurely removes dissolved metals from solution, which consists in grinding the ore in water in the presence of an oleaginous substance substantially unalterable by a metal solvent, and then subjecting the ore to a cyanide treatment.

4. The process of treating ores containing matter which prematurely removes dissolved metals from solution, which consists in grinding the ore in water in the presence of an oleaginous substance and subjecting the ore as thus conditioned to a cyanide treatment.

5. The process of treating ores containing matter which prematurely removes dissolved metals from solution, which consists in grinding the ore in water in the presence of an oleaginous substance, drying the ore as thus conditioned, and subjecting it to a cyanide treatment.

6. The process of treating ores containing matter which prematurely removes dissolved metals from solution, which consists in grinding the ore, mixing it with an oleaginous substance, and then, without removing said matter from the ore, subjecting the ore to a cyanide treatment.

7. The process of treating ores containing carbonaceous matter which consists in grinding the ore in the presence of an oleaginous substance substantially unalterable by a metal solvent, and, without removing the carbonaceous matter from the ore, subjecting the ore to a cyanide treatment.

8. The process of treating ores containing carbonaceous matter which consists in grinding the ore in water, mixing it with an oleaginous substance, and, without separating the carbonaceous matter from the ore, subjecting the ore to a cyanide treatment.

9. In the cyanide process of recovering gold and silver from ores containing organic or carbonaceous matter, the preliminary step which consists in treating the ore during or after crushing with a small quantity of mineral oil.

10. In the cyanide process of recovering gold and silver from ores containing organic or carbonaceous matter, the preliminary step which consists in treating the ore during or after crushing with a mineral oil in the proportion of from 0.2 pound to 0.3 pound of oil to each pound of carbon present in the ore.

ALBERT SILVER.